US009340066B2

(12) United States Patent
Mueller et al.

(10) Patent No.: US 9,340,066 B2
(45) Date of Patent: May 17, 2016

(54) WHEEL FOR MOTOR VEHICLE

(71) Applicant: BBS Japan Co. Ltd, Takaoka (JP)

(72) Inventors: Roman Mueller, Schiltach (DE); Thorsten Welte, Hausach (DE)

(73) Assignee: BBS Japan Co., Ltd. (JP)

( * ) Notice: Subject to any disclaimer, the term of this patent is extended or adjusted under 35 U.S.C. 154(b) by 174 days.

(21) Appl. No.: 14/347,954

(22) PCT Filed: Sep. 28, 2012

(86) PCT No.: PCT/EP2012/069194
§ 371 (c)(1),
(2) Date: Mar. 27, 2014

(87) PCT Pub. No.: WO2013/045618
PCT Pub. Date: Apr. 4, 2013

(65) Prior Publication Data
US 2014/0246895 A1    Sep. 4, 2014

(30) Foreign Application Priority Data

Sep. 30, 2011    (DE) .......................... 10 2011 083 834

(51) Int. Cl.
*B60B 23/06*    (2006.01)
*B60B 1/14*    (2006.01)
(Continued)

(52) U.S. Cl.
CPC . *B60B 23/06* (2013.01); *B60B 1/14* (2013.01); *B60B 5/02* (2013.01); *B60B 21/066* (2013.01); *B60B 23/10* (2013.01); *B60B 2310/305* (2013.01); *B60B 2310/306* (2013.01); *B60B 2310/307* (2013.01); *B60B 2310/316* (2013.01); *B60B 2360/104* (2013.01); *B60B 2360/106* (2013.01); *B60B 2360/3416* (2013.01);
(Continued)

(58) Field of Classification Search
CPC .......... B60B 3/04; B60B 3/005; B60B 3/041; B60B 3/044; B60B 3/045; B60B 3/10
See application file for complete search history.

(56) References Cited

U.S. PATENT DOCUMENTS

| 1,375,372 A | * | 4/1921 | Forsyth | ..................... B60B 3/02 152/402 |
| 1,398,615 A | * | 11/1921 | Williams | .................. B60B 3/08 29/894.321 |

(Continued)

FOREIGN PATENT DOCUMENTS

| DE | 1238354 | 7/1962 |
| DE | 4123459 | 11/1992 |

(Continued)

OTHER PUBLICATIONS

International Search Report dated Dec. 17, 2012 for PCT/EP2012/069194.
(Continued)

*Primary Examiner* — Brodie Follman
(74) *Attorney, Agent, or Firm* — Akerman LLP

(57) ABSTRACT

The invention relates to a wheel (1), particularly a partially light-metal wheel and/or a light-metal wheel for motor vehicles, essentially comprising a rim (2) and a wheel spider (3), wherein the wheel spider (3) is made of a carbon-fiber-reinforced plastic. According to the invention, the wheel (1) has a clamping ring (4). The wheel spider (3) can be fastened to the rim (2) by means of the clamping ring (4).

9 Claims, 5 Drawing Sheets

Figure 1:
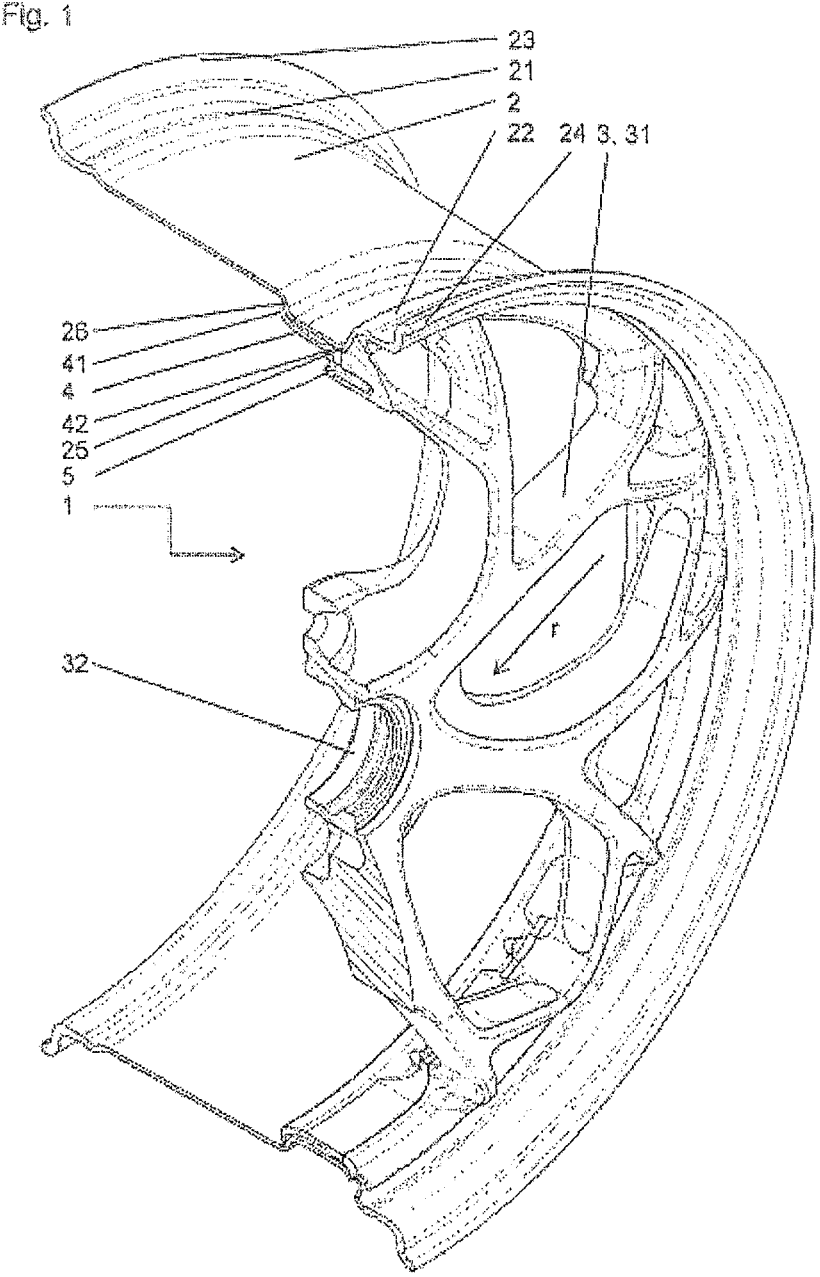

(51) Int. Cl.
*B60B 5/02* (2006.01)
*B60B 21/06* (2006.01)
*B60B 23/10* (2006.01)

(52) U.S. Cl.
CPC ..... *B60B2900/321* (2013.01); *B60B 2900/325* (2013.01); *B60Y 2200/10* (2013.01); *B60Y 2200/11* (2013.01)

(56) References Cited

U.S. PATENT DOCUMENTS

| | | | | |
|---|---|---|---|---|
| 1,461,690 A * | 7/1923 | Torkelson | ................. | B60B 7/02 152/DIG. 13 |
| 1,473,368 A * | 11/1923 | White | ................. | B60B 3/04 301/19 |
| 1,528,937 A * | 3/1925 | Main | ................. | B60B 3/04 152/427 |
| 1,533,438 A * | 4/1925 | Main | ................. | B60B 3/04 29/894.325 |
| 1,555,137 A * | 9/1925 | Main | ................. | B60B 3/04 301/6.1 |
| RE16,235 E * | 12/1925 | Williams | ................. | B60B 3/08 301/63.101 |
| 1,578,238 A * | 3/1926 | Davis | ................. | B60B 1/08 301/6.7 |
| 1,639,322 A * | 8/1927 | Williams | ................. | B60B 25/20 301/29.2 |
| 1,672,239 A * | 6/1928 | Williams | ................. | B60B 23/10 301/18 |
| 1,686,479 A * | 10/1928 | White | ................. | B60B 23/10 152/427 |
| 1,818,450 A * | 8/1931 | Barber | ................. | B60B 3/04 152/406 |
| 1,856,095 A * | 5/1932 | Frank | ................. | B60B 3/02 152/427 |
| 1,984,048 A * | 12/1934 | Walther | ................. | B60B 11/06 301/13.1 |
| 2,054,804 A | 9/1936 | Burrows | ................. | B60B 17/0041 295/11 |
| 2,179,934 A * | 11/1939 | Jones | ................. | H05B 3/748 219/460.1 |
| 2,197,608 A * | 4/1940 | Burger | ................. | B60B 11/06 152/396 |
| 2,418,123 A * | 4/1947 | Joy | ................. | F03C 1/0406 180/308 |
| 4,165,777 A * | 8/1979 | Sano | ................. | B60B 25/22 152/411 |
| 4,836,261 A * | 6/1989 | Weeks | ................. | B60B 25/22 152/398 |
| 4,838,616 A * | 6/1989 | Koch | ................. | B60B 3/002 301/10.1 |
| 5,772,288 A * | 6/1998 | Cvijanovic | ................. | B21D 53/26 301/63.105 |
| 6,036,280 A * | 3/2000 | Stanavich | ................. | B60B 3/02 301/63.103 |
| 6,315,366 B1 * | 11/2001 | Post | ................. | B60B 25/00 152/405 |
| 6,497,459 B2 * | 12/2002 | Hummel | ................. | B60B 1/08 301/64.101 |
| 6,921,138 B2 * | 7/2005 | Smyth | ................. | B60B 3/005 301/10.1 |
| 6,935,704 B2 * | 8/2005 | Guimard | ................. | B21D 53/26 301/63.101 |
| 7,758,131 B1 * | 7/2010 | Wolf | ................. | B60B 3/044 301/37.102 |
| 7,779,877 B2 * | 8/2010 | Putz | ................. | B60B 3/16 152/396 |
| 8,042,879 B2 * | 10/2011 | Kermelk | ................. | B21D 53/30 29/894.321 |
| 8,052,224 B2 * | 11/2011 | Luo | ................. | B23K 20/122 228/114.5 |
| 8,757,732 B2 * | 6/2014 | Kermelk | ................. | B60B 3/04 301/63.102 |
| 8,833,863 B2 * | 9/2014 | Schmidt | ................. | B60B 3/14 188/18 A |
| 8,840,193 B2 * | 9/2014 | Schmidt | ................. | B60B 3/14 188/18 A |
| 2003/0015909 A1* | 1/2003 | Meek, Jr. | ................. | B60B 19/00 301/10.1 |
| 2008/0143171 A1* | 6/2008 | Wilson | ................. | B60B 5/02 301/58 |
| 2009/0026832 A1* | 1/2009 | Baumgartner | ................. | F16F 15/324 301/37.24 |
| 2010/0019564 A1* | 1/2010 | Theuer | ................. | B29C 70/347 301/64.703 |
| 2012/0056467 A1* | 3/2012 | Hino | ................. | B60B 3/044 301/95.102 |
| 2013/0140874 A1* | 6/2013 | Fukaya | ................. | B60B 3/005 301/63.103 |
| 2013/0257139 A1* | 10/2013 | Goto | ................. | B60B 3/005 301/64.101 |
| 2014/0035348 A1* | 2/2014 | von Tardy-Tuch | ................. | B60B 3/001 301/63.102 |
| 2014/0246895 A1* | 9/2014 | Mueller | ................. | B60B 1/14 301/11.1 |
| 2014/0333121 A1* | 11/2014 | Hufenbach | ................. | B29C 70/462 301/63.101 |
| 2014/0346845 A1* | 11/2014 | Renner | ................. | B60B 3/004 301/37.42 |
| 2015/0069819 A1* | 3/2015 | Bueter | ................. | B60B 25/045 301/11.1 |
| 2015/0076896 A1* | 3/2015 | Werner | ................. | B60B 3/002 301/10.1 |
| 2015/0224818 A1* | 8/2015 | Hufenbach | ................. | B60B 3/14 301/63.107 |
| 2015/0231917 A1* | 8/2015 | Dressler | ................. | B60B 3/08 301/63.108 |

FOREIGN PATENT DOCUMENTS

| | | |
|---|---|---|
| DE | 20200504399 | 6/2005 |
| JP | 2008-532850 A | 8/2008 |
| JP | 2011-79358 A | 4/2011 |

OTHER PUBLICATIONS

Examination Report from priority application DE 10 2011 083 834.1 dated Jul. 27, 2012.
Japanese Office Action issued in connection with Japanese Application No. 2014-532404 (and translation of same).

* cited by examiner

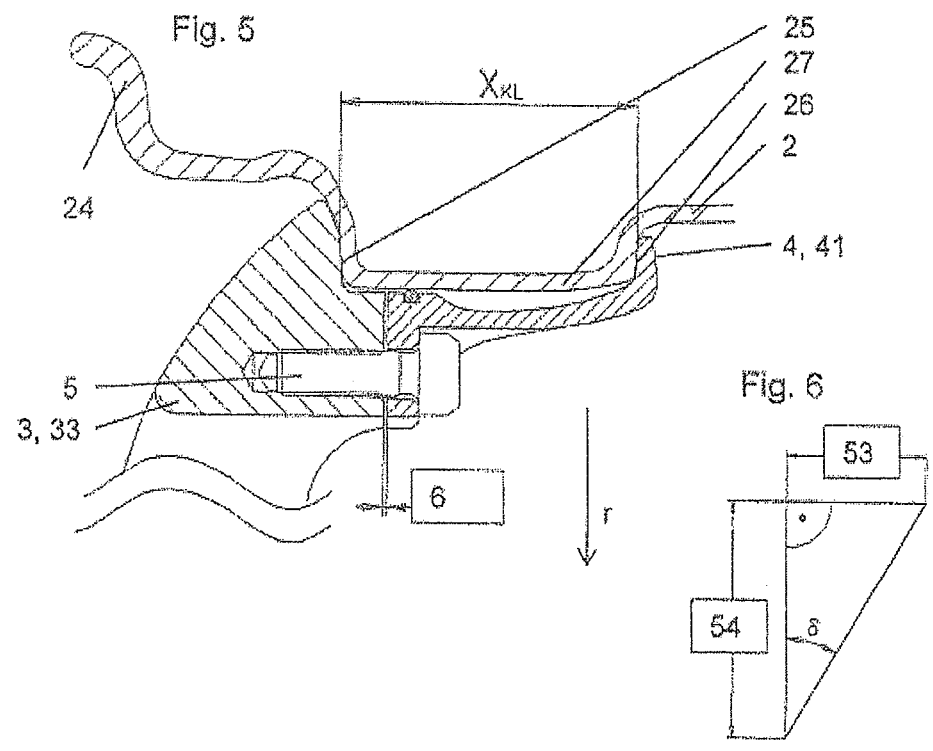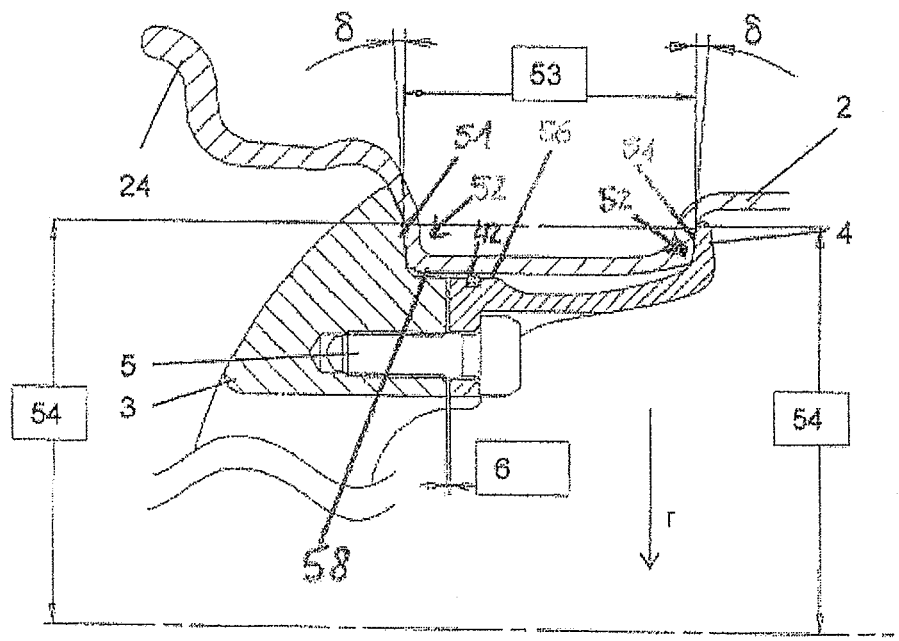

WHEEL FOR MOTOR VEHICLE

CROSS REFERENCE TO RELATED APPLICATION

This application is the National Phase application of International Application No. PCT/EP2012/069194, filed Sep. 28, 2012, which claims priority to German Patent Application No. 10 2011 083 834.1. These applications, in their entirety, are incorporated herein by reference.

The invention relates to a wheel, particularly a light-metal wheel for motor vehicles. The wheel essentially comprises a rim and a wheel spider. Light-metal wheels in the sense of the invention are understood as wheels that comprise light metal, at least partially, but also other materials, including non-metallic materials, and thus also partially light-metal wheels.

Such wheels are known in the prior art as multipart wheels. Differences in the properties of the materials used present challenges to specialists and continue to offer room for improvement. In particular, the joining of the multiple parts made of different materials requires continuous improvement.

These problems are solved according to the invention by a wheel with the characteristic features of patent claim 1 in combination with the features according to the definition of the species.

According to the invention, the wheel spider consists of a metal or a metal alloy, particularly a light metal such as magnesium or aluminum. The rim consists of a carbon-fiber-reinforced plastic, particularly with a thermoplastic or duromer matrix. The wheel spider can be fastened to the rim by means of a clamping ring.

By means of such a clamping ring, a defined pretension which is sufficient for receiving an operating load can be achieved between the components being joined. This proves to be advantageous when compensating for differing expansion coefficients of the carbon-fiber-reinforced plastic and the metal of the different components. The use of the clamping ring according to the invention leads to greater stability of the connection between rim and wheel spider.

According to an advantageous specific embodiment, the rim has a rim inner bed and a rim outer bed, which transition into a rim inner flange and a rim outer flange, respectively. The wheel spider is supported axially inward within a first circumferential contour, wherein the first circumferential contour is formed in the rim outer bed or in an area of the rim axially adjacent to the rim outer bed.

The clamping ring can slide on the contact surfaces in the radial direction. The contours of advantageous specific embodiments are coordinated in their bevels and clamping lengths such that no significant change in the pretension force occurs under cooling or warming, and a centering by means of the bevels is possible.

According to another advantageous specific embodiment, the clamping ring has a V-shaped or a U-shaped cross section. Particularly advantageously, the clamping ring has axially inward a collar that is formed radially outward. The collar is supported radially outward in a second circumferential contour of the rim.

According to another advantageous specific embodiment, the rim has a circumferential well that bulges radially inward. The side walls of the well are contours of the rim, particularly the first circumferential contour and the second circumferential contour.

Particularly advantageously, the side walls enclose an angle, of connection relative to the vertical when the wheel is in a vertical orientation, wherein the side walls in particular are formed within a connection area with a corresponding circumferential surface.

Under load—above all when negotiating turns and thus under a lateral force—a pretension of the clamping ring must be great enough that the clamping ring remains securely connected with the rim and the wheel spider. The rim formed according to the invention receives the clamping ring with the proposed well and its side walls so as to prevent the clamping ring from separating from the wheel spider or the rim under any driving conditions of the motor vehicle.

According to another advantageous specific embodiment, the clamping ring can be connected with the rim or with the wheel spider by means of fastening elements, particularly by means of screws that can be screwed into the wheel spider. The function of the clamping ring would not be used if the clamping ring were screwed together with both the rim and the wheel spider. Nevertheless, a screw connection of the clamping ring can indeed be attractive for aesthetic reasons as well, without regard for the function.

In an untensioned state of the clamping ring, if the clamping ring that has not yet been screwed on is in contact with the rim, a first gap is formed between the clamping ring and the rim or the wheel spider in an area of the ring in which the fastening elements are arranged. Upon reaching a tensioned state of the clamping ring, the first gap can be closed by tightening the fastening elements.

The clamping ring is thus pretensioned when loads occur due to driving conditions of the motor vehicle. The pretensioning causes a compression of a rim bed and an elongation of the clamping ring. A deformation of the wheel spider can be disregarded due to its design, cf. exemplary embodiment.

According to another advantageous specific embodiment, the wheel spider has a number of spokes that extend from a hub area in an essentially radial direction. At their ends, the spokes terminate in an outer ring that corresponds approximately to an inner diameter of the rim.

According to another advantageous specific embodiment, the screws can be screwed in radially outward areas of the spokes, particularly in the reinforced terminal areas of the spokes facing the outer ring.

According to another advantageous specific embodiment, wheel spider has projections and/or indentations, which are directed radially outward and face the rim, and the rim has projections and/or indentations corresponding in number to those of the wheel spider.

According to another advantageous specific embodiment, the clamping ring is formed bulging radially inward. As a result, the clamping ring contacts the rim only axially inward with a collar, wherein preferably the clamping ring circumferentially contacts the rim axially outward with a sealing ring, if at all.

It is further particularly preferred that the clamping ring, particularly the collar outside of the side wall, of the connection area and/or outside of the second circumferential contour, particularly in the radial direction, is spaced apart from the rim by a second gap, preferably in the axially outward area, and/or the wheel spider, particularly the outer ring, outside of the side wall, of the connection area and/or outside of the first circumferential contour, preferably in the radial direction, is spaced apart from the rim by a third gap, particularly in the axial inner area.

Here it is proposed in particular that the dimensions of the second gap and/or the third gap are such that in the event of an expansion of the clamping ring, particularly of the collar, and/or of the wheel spider, particularly of the outer ring, in the radial direction, particularly an expansion due to a thermal expansion at a prespecified first temperature, a direct contact of the clamping ring, particularly of the collar, and/or of the wheel spider, particularly of the outer ring, with the rim in the area outside of the side well, of the connection area, of the first circumferential contour and/or of the second circumferential contour is avoided.

A wheel according to the invention can also be characterized in that the angle of connection is selected such that in the event of a thermal compression of the clamping ring, particularly of the collar, and/or of the wheel spider, particularly of the outer ring, in the radial direction and/or the axial direction, particularly due to a thermal compression at a prespecified second temperature, the clamping ring, particularly the collar, and/or the wheel spider, particularly the outer ring, on the side wall, of the first circumferential contour, of the second circumferential contour, particularly in the connection area, is subject to a pretension, wherein the pretension is preferably below a prespecified maximum tension and/or above a prespecified minimum tension, particularly throughout an entire temperature range between the second temperature and the first temperature.

Finally, it is proposed with the invention that the first temperature is approximately 120° C. and/or the second temperature is approximately −40° C.

The invention will be explained in greater detail below based upon the exemplary embodiment shown in the figures. A classic spoke design with Y-shaped spoke stems was selected in order to explain the invention. As an alternative all types of wheel spiders or equivalent wheel elements can be used according to the invention.

Figure 2:
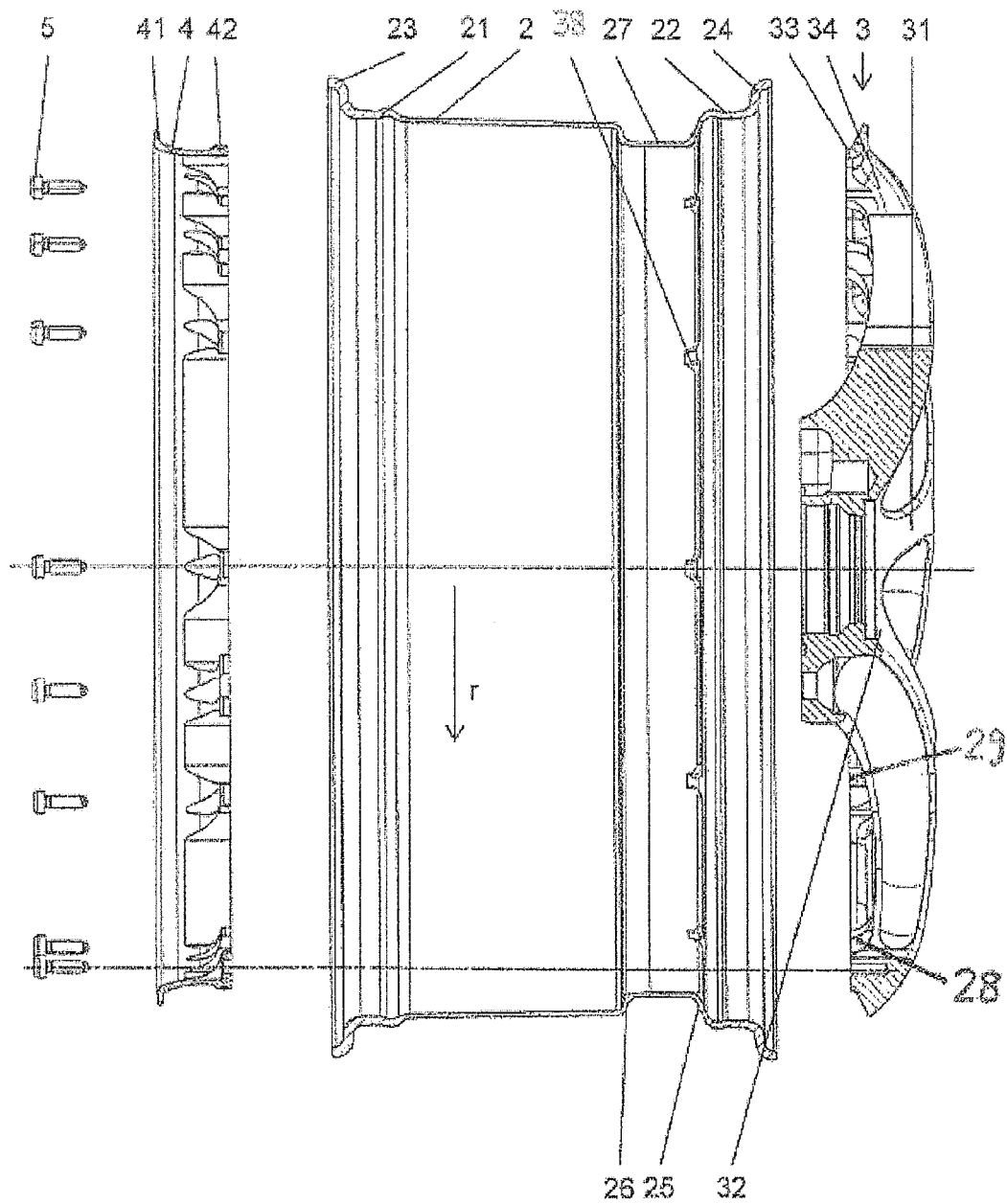
Figure 3:
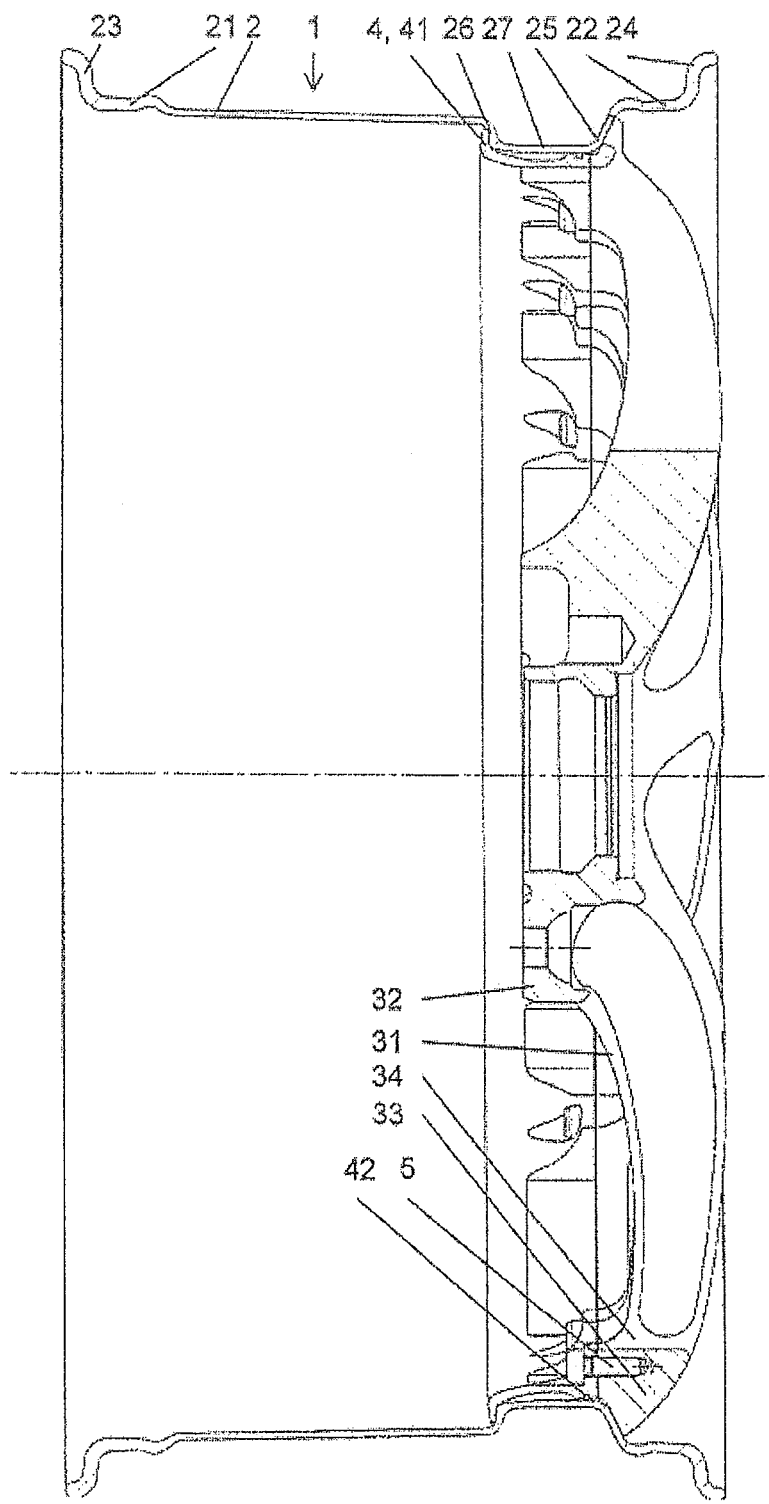

The invention is explained in greater detail based upon the figures. These show:

FIG. 1 a perspective view of a wheel that has been sectioned along its axis,

FIG. 2 a further axial section through an exploded view of the wheel,

FIG. 3 the axial section from FIG. 2 through the assembled wheel

Figure 4:
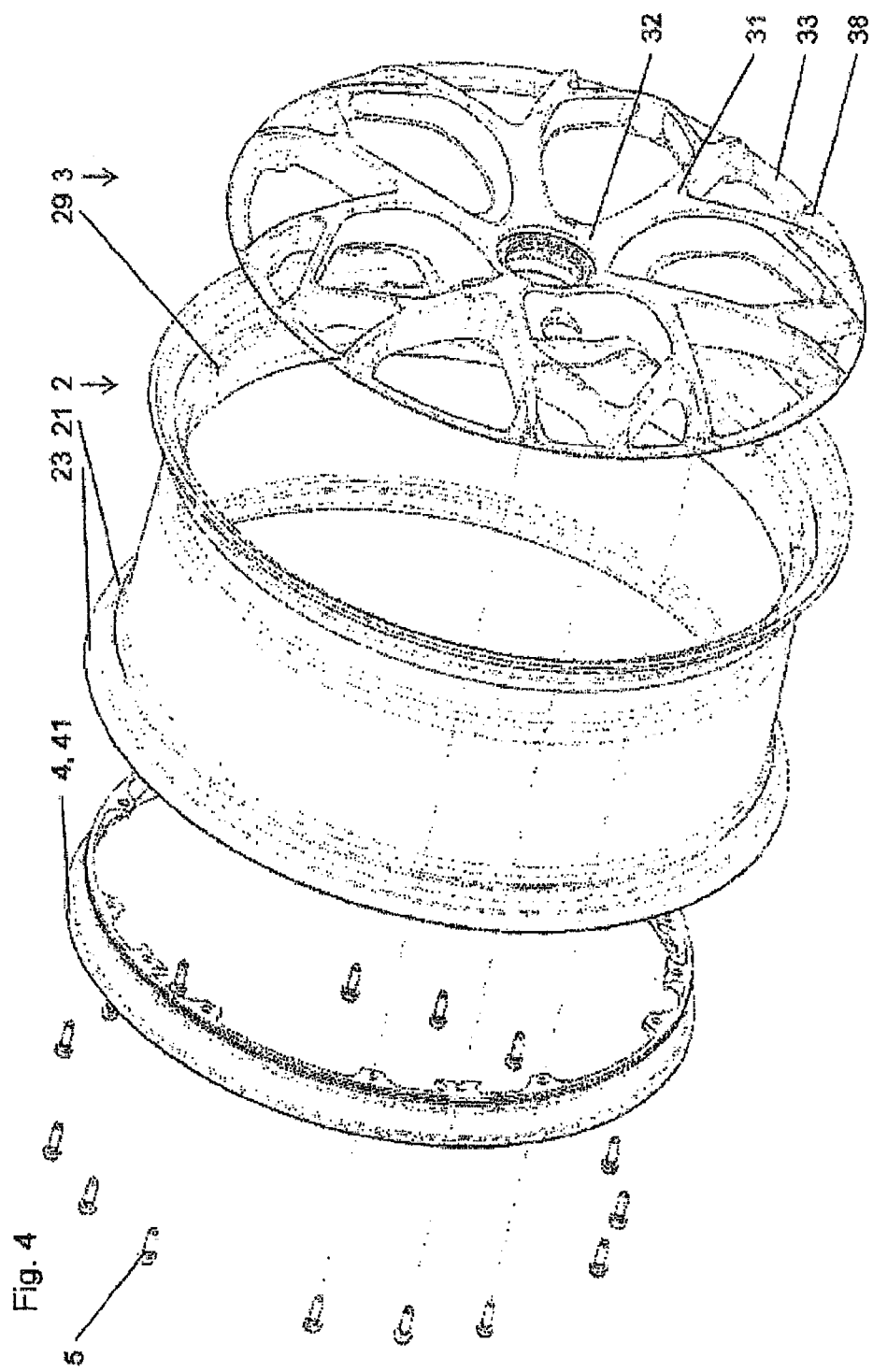

FIG. 4 a perspective view as an exploded view of the wheel, and

FIG. 5 an enlarged view of an axial section, wherein one area around a clamping ring according to the invention in an untensioned state is broken out, FIG. 6 an auxiliary drawing for calculating an angle of connection, and FIG. 7 the enlarged view from FIG. 5, wherein the clamping ring is shown in a tensioned state.

FIGS. 1 to 5 and 7 show an exemplary embodiment of a wheel 1 according to the invention, in the present case a light-metal wheel for motor vehicles with a wheel spider 3 made of metal and a rim 2 made of carbon-fiber-reinforced plastic. Wheel spider 3 can be fastened to rim 2 by means of clamping ring 4. Ring 2 is not damaged thereby, since clamping ring 4 is mounted only on rim 2 and pulls wheel spider 3 against rim 2. By means of clamping ring 4, a pretension force is applied to the components being connected. Thus wheel spider 3 is mounted only on rim 2. Advantageously, there is no screw connection into rim 2.

The same parts are given the same reference numbers. For a better overview, not all of the reference numbers are shown in all figures.

Rim 2 has a rim inner bed 21 and a rim outer bed 22. The area designated as the rim inner bed is often also described as the rim inner shoulder, and the area designated as the rim outer bed 22 is often also designated as the rim outer shoulder. Retaining elements, intended to prevent the tire from slipping into the middle area of the rim, can be connected to these toward the center of the rim. Both rim inner bed 21 and rim outer bed 22 transition into a rim inner flange 23 and a rim outer flange 24, respectively. Axially inward in the sense of the present invention is therefore to be understood as a direction facing towards a central longitudinal axis of the vehicle, whereas axially outward is to be understood as a side facing away from the central longitudinal axis of the vehicle. Thus in rim 2 at least a first circumferential contour 25 is formed, into which wheel spider 3 can be inserted with a radially outward and axially inward contact contour. Wheel spider 3 is therefore received in such a way that it is supported axially inward in rim 2.

Wheel spider 3 has a number of spokes 31, which extend proceeding outward from a hub area 32 in an essentially radial direction r. Spokes 31 terminate radially outward in an outer ring 33 that approximately corresponds to an inner diameter of rim 2. In the present specific embodiment, the contact contour of wheel spider 3 with rim 2 is formed by means of outer ring 33.

In addition to the circumferential contact contour, outer ring 33 has circumferential projections 28. Projections 28 face rim 2 and are formed corresponding to rim 2. Projections 28 are arranged on outer ring 33 distributed across its circumference.

Additionally, outer ring 33 has an indentation 29 that is designed to receive a corresponding projection of rim 2. Projections 28 and indentation 29 serve as an anti-twisting measure for receiving the braking and driving torque.

Projections 28 mesh into indentations 38, which are formed in rim 2 pursuant to FIG. 2.

In a radially inward and axially inward direction, rim 2 has a second circumferential contour 26. Clamping ring 4 is formed corresponding to this second circumferential contour 26. In order to be supported axially outward against second circumferential contour 26, clamping ring 4 has a collar 41 that is formed radially outward.

First circumferential contour 25 and second circumferential contour 26 are side walls 51 of a circumferential well 27 that bulges radially inward from rim 2. This area 27 is also often referred to in a general sense as deep bed of rim 2.

Clamping ring 4 is (FIG. 1, FIG. 3) or can be (FIG. 2, FIG. 4) screwed into wheel spider 3 by means of screws 5. For this purpose, internal threads are implemented in the radially outward areas of the spokes 31, in reinforced terminal areas 34 of spokes 31 toward outer ring 33. Alternatively, instead of a screw connection, riveting or dowelling is also a possibility. Moreover, instead of a point-by-point fastening of clamping ring 4 with wheel spider 3, an adhesive can also be used as a means of fastening, wherein detachable connections are preferred.

Clamping ring 4 is implemented with a bulge that approximately corresponds to well 27, wherein clamping ring 4 almost completely encompasses well 27 radially inward. In an axially outward area, a sealing ring 42 is placed with a radially outward orientation into clamping ring 4, which presses radially outward against well 27. The axially outward side wall of well 27 is not encompassed by clamping ring 4. In the axially outward area, the clamping ring extends radially inward with tabs distributed across its circumference. Through-penings are implemented in the tabs, through which screws 5 can be guided. Particularly advantageously, the heads of screws 5 recede into the through-openings of the tabs.

FIGS. 5 and 7 show an enlarged view of a bracing of rim 2 and spider 3 by screws 5 by means of clamping ring 4. The bracing is defined by the geometric shapes of the components and a first gap 6 between clamping ring and spider (in an untensioned state, FIG. 5) and a clamping length, wherein the clamping length is prespecified by a well width 53 of well 27. First gap 6 can be closed by means of screw 5 (FIG. 7), which results in a pretension of clamping ring 4.

The pretension results in a compression of the carbon-fiber-reinforced plastic bed of rim 2 selected in the exemplary embodiment and an elongation of clamping ring 4. A deformation of spider 3 can be disregarded due to its design.

In order to introduce an optimal pretension force into the system, in the exemplary embodiment, first gap 6 between clamping ring 4 and spider 3 takes production tolerances into account. To minimize the influence of production tolerances, the system must be as flexible as possible. This also makes the clamping system insensitive to permanent deformation. In the tensioned state and under load—above all when negotiating turns and thus under a lateral force—the pretension of the screws on the clamping ring must be great enough that first gap 6 remains closed. Any separation between clamping ring 4 and spider 3 is impermissible.

As a result of different operating temperatures in a range between −40° C. and +120° C., differing expansion behaviors may occur due to differing heat expansion coefficients of the individual components. This has a direct influence on the pretension of the components. In the process, the components expand radially and axially or contract. The decisive factor for the pretension in this process is the expansion component in the axial direction.

A very low or nonexistent heat expansion coefficient can be assumed for the carbon-fiber-reinforced plastic bed. For the purpose of simplicity, only the expansion of spider 3 and clamping ring 4 is considered. FIG. 6 illustrates a consideration based upon which well width 53 depends upon an angle of connection δ, which should therefore be as small as possible. Pursuant to FIG. 7, angle of connection δ is the angle between a vertical and the contour of side wall 51 or contours 25, 26 within a connection area 52 when wheel 1 is in a vertical orientation. An advantageous specific embodiment of the invention proposes a compromise, since the greater the angle of connection δ, the more flexible the pretension system and thus its insensitivity to permanent deformation.

Axial expansion under temperature causes a loss of pretension force. A relief of load occurs because essentially only spider 3 and clamping ring 4, although not the rim bed, expand axially. By contrast, there will be an increase in pretension force under cold temperatures. The greater a clamping length resulting from the selection of well width 53, the greater the decline in pretension force as temperatures increase.

Advantageously, the components of the pretension system are designed so that axial and radial pretension sections correspond at least approximately. This is achieved with an advantageous specific embodiment according to the invention through an optimal selection of angle of connection δ, clamping length 53, and clamping radius 54. This makes the clamping system stable against temperature fluctuations with respect to the pretension force.

The stability of the pretension force even under different temperatures is achieved according to the invention particularly in the following manner.

If wheel 1 is heated, this heating essentially does not result in a change in the shape of rim 2. On the contrary, because of the heat expansion coefficient of wheel spider 3 or outer ring 33, as well as of clamping ring 4, for example [sic], there is an expansion of wheel spider 3 and clamping ring 4 in both the radial direction r and in an axial direction.

As shown particularly in FIG. 7, both wheel spider 3 and clamping ring 4 outside of connection area 52 and side walls 51, respectively, are spaced apart in a radial direction from well 27 by a second gap 56 and a third gap 58, respectively. Because of the thermal radial expansion of clamping ring 4 or wheel spider 3 at higher temperatures, although there is a reduction in the size of second gap 56 and third gap 58, a direct contact with well 27 in the radial direction is avoided.

The thermal expansion of wheel spider 3 and clamping ring 4, however, also simultaneously results in an enlargement of their axial expansion. Because of the formation of angle of connection δ in the area of connection area 52, however, the respective contact point of wheel spider 3 and clamping ring 4 with rim 2 in the area of side walls 51 will move radially outward due to a simultaneous radial and axial expansion. Nevertheless, the pretension force applied to connection area 52 of well 27 in this area will essentially remain the same due to inclination [sic; angle of connection] δ.

By contrast, a shrinkage or compression of wheel spider 3 and clamping ring 4 due to a thermal shrinkage or compression caused by a reduction in temperature results in that the sizes of second gap 56 and third gap 58 increase due to the radial compression. This causes the contact point between wheel spider 3, particularly outer ring 33, or clamping ring 4, particularly collar 41 and side walls 51 in connection area 52 to migrate radially inward. Due to the formation of angle of connection δ and connection area 52, however, a pretension will be essentially retained because the migration of the contact point in the radially inward direction precisely compensates for the thermal compression of wheel spider 3 or clamping ring 4 in the axial direction.

This ensures that a maximal load is not exceeded in the event of thermal compression, and a minimum load is not fallen below in the event of a thermal expansion.

In a particularly preferred specific embodiment, as already explained above, sealing ring 42 is arranged in the area of second gap 56. However, no force is essentially built up by way of sealing ring 42 in the radial direction on rim 2, particularly in the area of well 27. The elasticity of sealing ring 42 merely ensures that sealing ring 42 remains in contact with well 27 and thus prevents foreign substances, such as dirt or water, from entering the area of second gap 56 and/or third gap 58, without sealing ring 42 creating resistance against a reduction of gap 56.

As finally shown in FIG. 7, clamping ring 4 encompasses a greater axial area of well 27 as compared to wheel spider 3. In particular, this results in that the thermal expansion and the thermal compression of wheel spider 3 and clamping ring 4, respectively, are compensated for in such a way that an essentially constant pretension is maintained.

Nevertheless, this has the simultaneous result that as compared to wheels known from the prior art, clamping ring 4 is arranged on the axial inner side of wheel 1 and not on the axial outward side, so as to provide sufficient clearance for corresponding braking equipment within wheel 1.

At the same time, this results in a visually advantageous design of wheel 1 in a view from the axial outward direction. This is exactly the area where wheel spider 3 is arranged. The wheel spider has no opening or screw connection on its axial outward side, however, because these are arranged on the axial inward side, on which it is joined with clamping ring 4 by means of screws 5.

The features disclosed in the preceding description, in the claims, and in the drawings can therefore be essential for the invention in its various specific embodiments individually or in any combination.

LIST OF REFERENCE NUMERALS

1 Wheel
2 Rim

3 Wheel spider
4 Clamping ring
5 Screw
6 First gap
21 Rim inner bed
22 Rim outer bed
23 Rim inner flange
24 Rim outer flange
25 First circumferential contour
26 Second circumferential contour
27 Well
28 Projection
29 Indentation
31 Spoke
32 Hub area
33 Outer ring
34 Terminal area
38 Indentation
41 Collar
42 Sealing ring
51 Side wall
52 Connection area
53 Well width
54 Clamping radius
56 Second gap
58 Third gap
r Radial direction
δ Angle of connection

The invention claimed is:

1. A wheel at least partially made of a light metal for motor vehicles, comprising a rim and a wheel spider, wherein the wheel spider comprises a metal or a metal alloy and the rim comprises a carbon-fiber-reinforced plastic, the wheel has a clamping ring and the wheel spider can be fastened to the rim by means of the clamping ring, wherein the clamping ring has axially inward a collar that is formed radially outward and supported axially outward by a second circumferential contour of the rim.

2. A wheel at least partially made of a light metal for motor vehicles, comprising a rim and a wheel spider, wherein the wheel spider comprises a metal or a metal alloy and the rim comprises a carbon-fiber-reinforced plastic, the wheel has a clamping ring and the wheel spider can be fastened to the rim by means of the clamping ring, wherein the clamping ring can be connected with the rim and/or the wheel spider by way of screws, and can be screwed into the wheel spider, wherein in an untensioned state of the clamping ring, when the clamping ring is in contact with the rim, within a ring area in which the screws are arranged, a first gap is formed between the clamping ring and the rim or the wheel spider, which is closed in a tensioned state of the clamping ring, or after a tightening of the screws.

3. The wheel in accordance with claim 2, wherein the wheel spider has a number of spokes, which extend outwardly from a hub area essentially in a radial direction (r), and which terminate at their ends in an outer ring that approximately corresponds to an inner diameter of the rim.

4. The wheel in accordance with claim 3, wherein the screws can be screwed in radially outward areas of the spokes, in reinforced terminal areas of the spokes toward the outer ring.

5. A wheel at least partially made of a light metal for motor vehicles, comprising a rim and a wheel spider, wherein the wheel spider comprises a metal or a metal alloy and the rim comprises a carbon-fiber-reinforced plastic, the wheel has a clamping ring and the wheel spider can be fastened to the rim by means of the clamping ring, wherein the clamping ring is formed bulging radially inward, and the clamping ring contacts the rim only axially inward with a collar, wherein the clamping ring circumferentially contacts the rim axially outward with a sealing ring.

6. A wheel at least partially made of a light metal for motor vehicles, comprising a rim and a wheel spider, wherein the wheel spider comprises a metal or a metal alloy and the rim comprises a carbon-fiber-reinforced plastic, the wheel has a clamping ring and the wheel spider can be fastened to the rim by means of the clamping ring,
wherein the clamping ring, outside of a side wall of a connection area and/or outside of a second circumferential contour, in a radial direction (r), is spaced apart from the rim by a second gap in an axially outward area, and/or the wheel spider, outside of the side wall of the connection area, and/or outside of a first circumferential contour, in the radial direction (r), is spaced apart from the rim by a third gap, in an axial inner area.

7. The wheel in accordance with claim 6, wherein the second gap and/or the third gap has or have dimensions such that in the event of an expansion of the clamping ring and/or of the wheel spider in the radial direction (r), and in the event of an expansion due to a thermal expansion at a prespecified first temperature, a direct contact of the clamping ring and/or of the wheel spider with the rim in the area outside of the side wall, of the connection area, of the first circumferential contour and/or of the second circumferential contour is avoided.

8. A wheel at least partially made of a light metal for motor vehicles, comprising a rim and a wheel spider, wherein the wheel spider comprises a metal or a metal alloy and the rim comprises a carbon-fiber-reinforced plastic, the wheel has a clamping ring and the wheel spider can be fastened to the rim by means of the clamping ring, wherein the rim has a circumferential well that bulges radially inward and wherein contours, a first circumferential contour and a second circumferential contour, are formed in the rim by a side walls of the well,
wherein the side walls enclose an angle of connection (δ) relative to a vertical line within a connection area when the wheel is in a vertical orientation, and
wherein the angle of connection (δ) is selected such that in the event of a thermal compression of the clamping ring and/or of the wheel spider in a radial direction (r) and/or an axial direction due to a thermal compression at a prespecified second temperature, the clamping ring and/or the wheel spider is subject to a pretension, wherein the pretension is preferably below a prespecified maximum tension and/or above a prespecified minimum tension, throughout an entire temperature range between the second temperature and a first temperature.

9. The wheel in accordance with claim 7, wherein the first temperature is approximately 120° C. and/or the second temperature is approximately −40° C.

* * * * *